July 25, 1944.  R. A. FONTAINE  2,354,450
CLOSURE FOR VEHICLE BODIES
Filed June 13, 1940  3 Sheets-Sheet 1
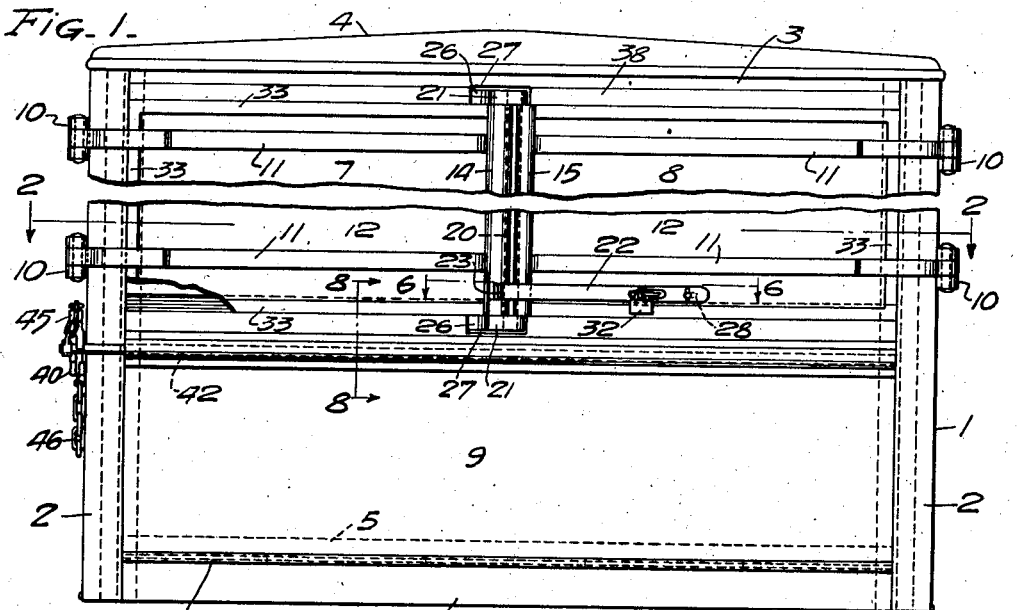
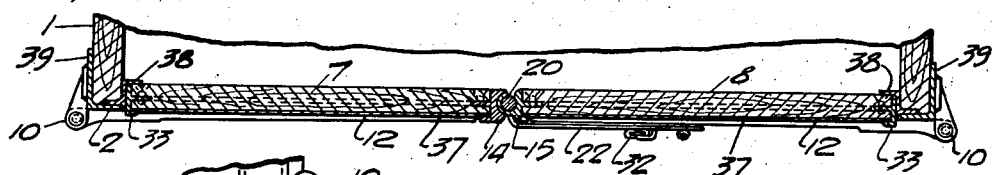
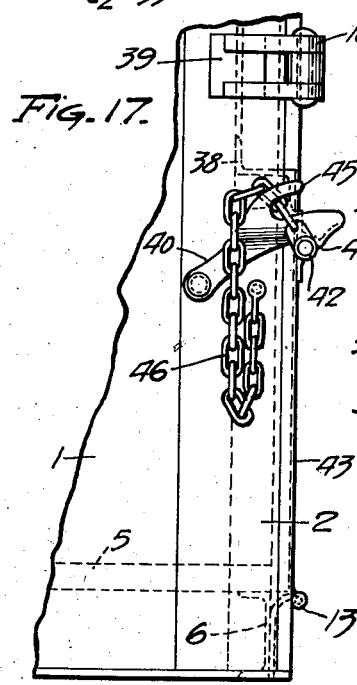
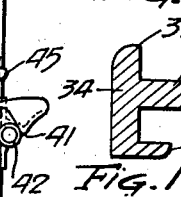
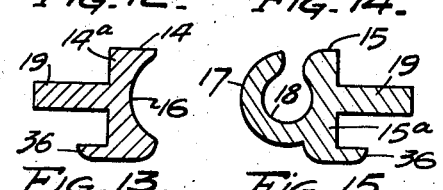
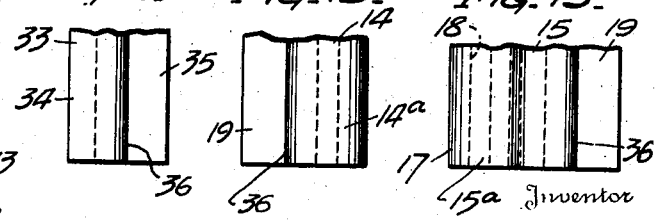
Inventor
Robert A. Fontaine
By Ernest F. Mechlin
his Attorney July 25, 1944.   R. A. FONTAINE   2,354,450
CLOSURE FOR VEHICLE BODIES
Filed June 13, 1940   3 Sheets-Sheet 2
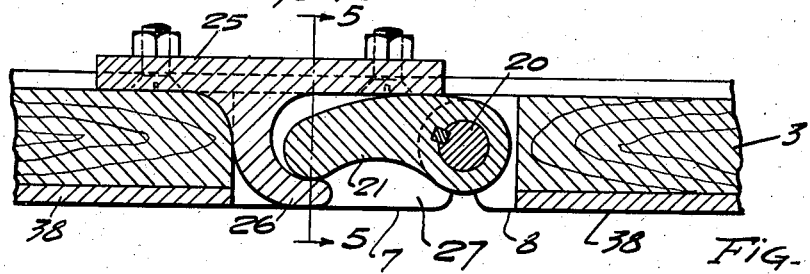
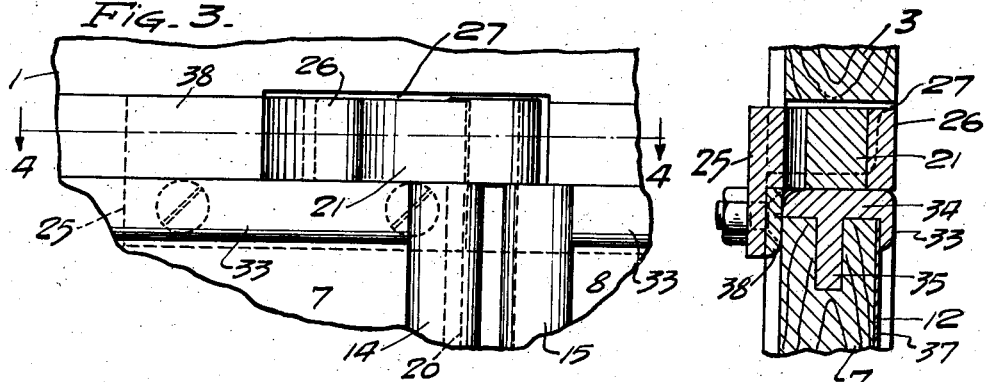
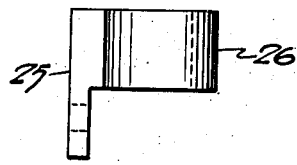
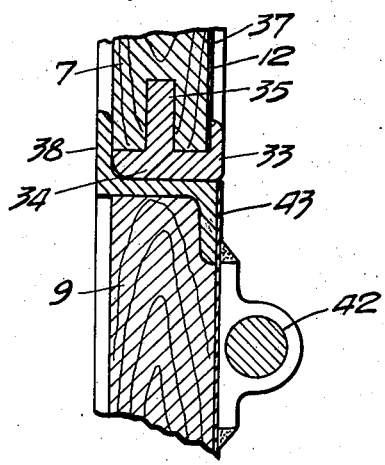
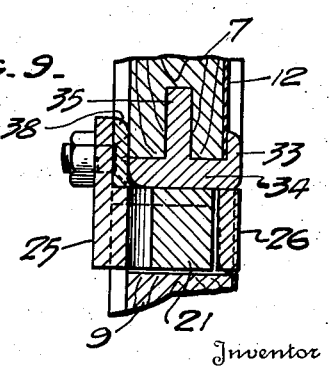
Inventor
Robert A. Fontaine
By Ernest T. Mechlin
his Attorney

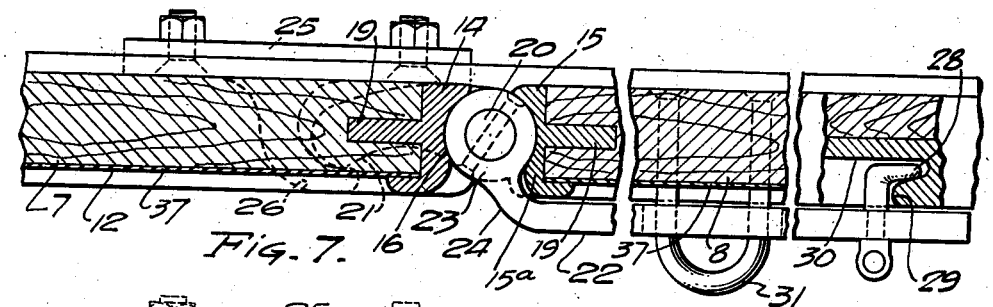
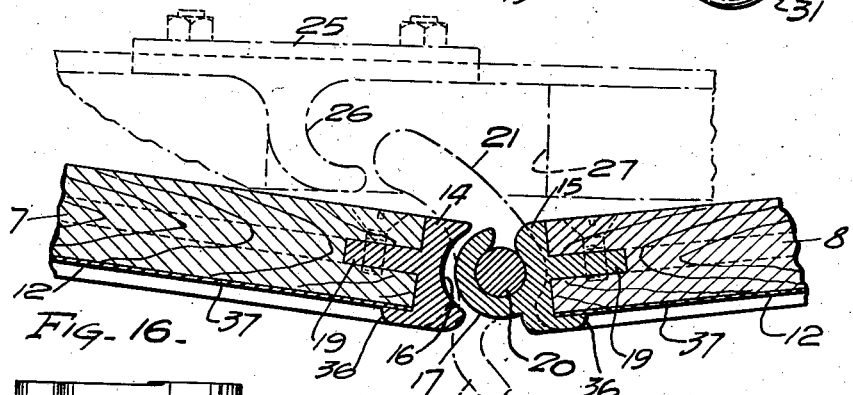
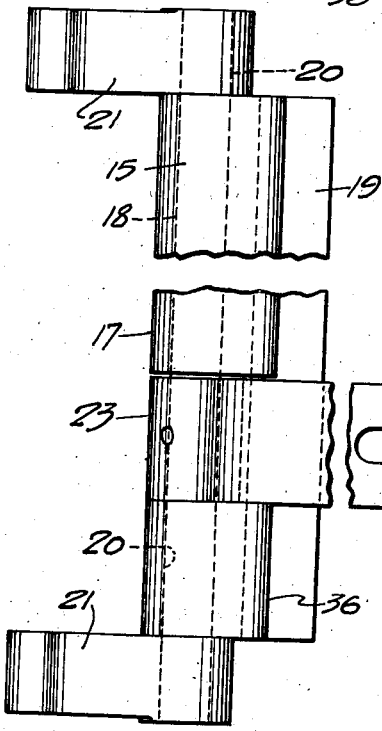
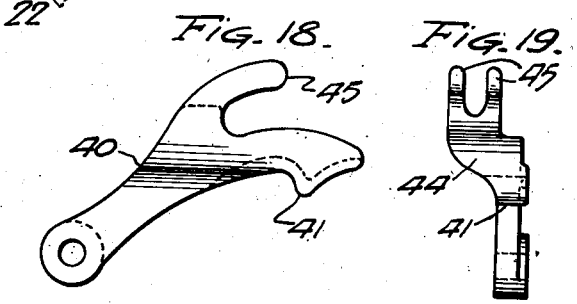

Patented July 25, 1944

2,354,450

UNITED STATES PATENT OFFICE 2,354,450

CLOSURE FOR VEHICLE BODIES

Robert A. Fontaine, Martinsville, Va.

Application June 13, 1940, Serial No. 340,405

14 Claims. (Cl. 296—106)

This invention relates generally to closures for vehicle bodies and more particularly to closures of the type in which the open rear end of the vehicle body is enclosed by a pair of doors, usually supplemented by a tail gate.

In the design of closures for openings in vehicle bodies attention has heretofore been directed principally to means for effectively closing the doors to prevent their opening in transit. While such single mindedness of purpose is not particularly objectionable in ordinary automobiles in which the doorways can be satisfactorily braced, it is extremely so in delivery trucks and trailers in which bracing of the body adjacent its open rear end is not only very expensive but also necessitates curtailment of the usable space within the body. Instead of attacking this problem from a different angle, manufacturers have continued to rely upon inadequate reinforcement of the rear ends of such bodies with the result that they are incapable of resisting the twisting and bending forces to which they are continually subjected in service and disintegrate in a relatively brief period.

The primary object of the invention is to provide a closure for an opening in a vehicle body which, when closed, forms a substantially rigid panel connecting the sides of the opening and bracing the body against distortion.

Another object of the invention is to provide a closure for an opening in a vehicle body which fits snugly against the surfaces of the body defining the opening whereby the interior of the body is sealed against weather damage.

Another object of the invention is to provide substantially non-deformable strips mountable on the edges of the members closing an opening in a vehicle body, whereby the above objects are attained, which can be readily produced and attached to the closure members.

A further object of the invention is to provide interlocking members mountable on the contiguous edges of a pair of doors closing an opening by which the doors can be locked against relative movement.

A still further object of the invention is to provide a locking mechanism for a pair of doors having interlocking members on their contiguous edges which is mounted in one of the interlocking members.

An additional object of the invention is to provide a chain lock for a tail gate by which accidental unlatching of the tail gate is prevented.

In the drawings illustrating a preferred embodiment of the invention:

Figure 1 is an end elevational view of a vehicle body showing the doors and tail gate in closed position.

Figure 2 is a horizontal sectional view of the rear end of the body taken along the lines 2—2 of Figure 1, looking in the direction of the arrows.

Figure 3 is a view on an enlarged scale of the locking mechanism at the upper extremity of the doors.

Figure 4 is a horizontal sectional view taken along the lines 4—4 of Figure 3, looking in the direction of the arrows.

Figure 5 is a vertical sectional view taken along the lines 5—5 of Figure 4, looking in the direction of the arrows.

Figure 6 is an enlarged cross sectional view taken along the lines 6—6 of Figure 1, looking in the direction of the arrows, with portions broken away to more clearly show the means for locking the lever arm in door closing position.

Figure 7 is an enlarged view of the central portion of Figure 2, with the doors partially open, the locking mechanism at their lower extremities being shown schematically.

Figure 8 is an enlarged cross sectional view taken along the lines 8—8 of Figure 1, looking in the direction of the arrows.

Figure 9 is a view of the lower extremity of the doors and the adjacent portion of the tail gate taken on the same vertical plane as Figure 5.

Figure 10 is a cross sectional view of one of the sealing strips which are applied to all except the confronting edges of the doors.

Figure 11 is an elevational view of a portion of the sealing strip shown in Figure 10.

Figure 12 is a cross sectional view of the interlocking member applied to the inner edge of one of the doors.

Figure 13 is an elevational view of a portion of the interlocking member shown in Figure 12.

Figure 14 is a cross sectional view of the interlocking member applied to the confronting edge of the other door.

Figure 15 is an elevational view of a portion of the interlocking member shown in Figure 14.

Figure 16 is an elevational view of the door locking mechanism mounted in the interlocking member on one of the doors with the surrounding structure removed to more clearly show the details of construction.

Figure 17 is an enlarged side elevational view of the lower portion of the rear end of the body showing the chain lock for the tail gate latch in locked position.

Figure 18 is an elevational view of the tail gate latch.

Figure 19 is an end elevational view of the latch of Figure 18.

Figure 20 is an elevational view of one of the door latching elements.

Figure 21 is an end elevational view of the element of Figure 20.

Referring more particularly to the drawings, 1 designates the body of a truck, trailer or other vehicle of which only the rear portion is illustrated.

The rear end of the body is capable of being opened for loading and unloading and is bounded by the side walls 2 of the body, a facia plate 3 forming a support for the roof 4, and a floor 5 which is carried on a channel beam 6 extending between the side walls of the body.

The closure for the rear end of the body includes a pair of horizontally swinging doors 7 and 8, preferably supplemented by a vertically swinging tail gate or tail board 9. When the gate 9 is used in conjunction with the doors it is usually positioned below the doors and adapted to close that portion of the rear end of the body over which the doors do not extend. The doors are hingedly or pivotally attached adjacent their outer ends to the side walls on opposite sides of the rear end of the body by hinges 10, the straps 11 of which desirably extend across the outer or rear faces 12 of the doors for a substantial portion of their width to both reinforce the doors and distribute their weight over a greater area. The tail gate is hingedly attached adjacent its lower end to the body by a hinge 13 which may be mounted on the beam 6.

As a requisite of the rigidity required of the closure for effectively bracing the rear end of the body is an interlock between the doors, the inner, confronting or contiguous edges of the doors 7 and 8, between their upper and lower limits, are provided respectively with strips, cover plates or interlocking members 14 and 15. To enable these members to engage and interlock or interfit, the outer surfaces of the base plates 14ª and 15ª of the members 14 and 15, respectively, are complementally formed, the outer surface 16 of the plate 14ª being concave and the corresponding surface 17 of the plate 15ª being convex. Additionally, the confronting surfaces are preferably cylindrical, and while their radii need not be equal, substantial equality is desirable because of the advantages of the resulting surface contact between the engaging surfaces over the line contact which would otherwise be obtained. While the radii of the curved surfaces are not of particular moment, they should not exceed those of the arcs described by the surfaces on opening of the doors, since such slightly curved surfaces would be incapable of locking the doors against relative or independent movement. For reasons to be discussed, infra, the plate 15ª, between its outer and inner or door abutting surfaces, is formed in the shape of a C or interrupted ring the inner walls of which define a cylindrical recess or aperture 18 extending longitudinally of the plate, its axis being substantially parallel to that of its outer surface.

The interlocking members are attached or secured to the doors in any suitable manner. If the doors are made of wood, as are those illustrated in the drawings, the members can be attached satisfactorily through integrally formed tongues or ribs 19 which extend longitudinally of and project outwardly from the inner surfaces of the base plates of the members, intermediate their edges. To accommodate the tongues the edges of the doors are grooved or channeled; the tongues, when seated in the grooves, being secured in place, as by countersunk screws. The strips or interlocking members may be made of any material having the required strength and formability. However, as the shapes here desired are readily extrudable, aluminum is preferred because of its lightness.

The door closing or locking mechanism includes a shaft 20 which is rotatably mounted in the recess 18 in the plate 15ª and extends beyond the upper and lower extremities of the doors. Fixedly attached or carried on the shaft adjacent its ends is a pair of dogs or cam fingers 21. The shaft and the attendant dogs are actuated or rotated by a lever arm or actuating bar 22 which is fixedly attached or secured to the shaft intermediate its ends. While the lever arm could be attached to the shaft adjacent the lower limits of the door by shortening the interlocking members the requisite amount, it is preferable to attach it to the shaft intermediate the ends of the interlocking members so that it may share with the upper dog the burden of supporting the load of the shaft. This is accomplished with a minimum loss of material in the interlocking members by so shaping the collared head 23 of the lever arm that the convex outer face of the interlocking member by which it is carried will be uninterrupted, and by offsetting or angularly disposing the neck 24 of the lever arm adjacent the head to permit the major portion of the arm to lie parallel to the outer face of the door. Although this construction necessitates recessing of both interlocking members, one to accommodate the head of the lever arm and the other to accommodate the neck on operation of the lever, it enables both the continuity of the interlocking members and the leak-proof juncture between the doors to be retained.

The coacting or cooperating parts of the locking mechanism are a pair of brackets 25 having cam or dog engaging hooks 26 which are mounted adjacent the upper and lower limits of the tail gate and facia plate, respectively, the brackets abutting the inner surfaces of the gate and facia plate and the hooks extending through appropriate recesses 27 in these members. To enable the hooks to face in the same direction, the brackets are made right and left. If the tail gate were to be dispensed with the lower bracket would be similarly attached to the body member connecting the side walls below the opening. After the doors have been partly closed, manually, the dogs engage their respective hooks. The lever arm is then actuated and the doors forced into and locked in closed position by the cam action of the dogs. Conversely, reverse movement of the lever will both unlock the doors and force them partly open.

For maintaining the doors in closed position, there is preferably provided a locking finger 28 which is rotatably mounted on the lever arm adjacent its outer edge and adapted to interlock with the lip 29 of the recessed retaining plug 30 mounted in the door 8. Unauthorized opening of the doors can be prevented by slotting the lever arm to accommodate a staple 31 mounted in the door and adapted to carry any suitable locking device, such as the illustrated padlock 32.

The upper, lower and outer edges of the doors are preferably fitted with sealing strips or cover plates 33 which, with the interlocking members, form a continuous framework or reinforcement around each of the doors. The sealing strips have substantially flat outer surfaces 34, unlike those of the locking members, although they may be attached similarly to the doors by the provision of longitudinally extending tongues or ribs 35 which project outwardly from their inner faces and are adapted to seat in grooves in the edges of the doors. Like the interlocking members, the sealing strips are preferably made of aluminum. By mounting upon all but the contiguous edges of the doors strips having smooth wear resistant surfaces, close contact or tight engagement between the doors and the adjacent faces of the facia plate side walls and tail gate is made feasible.

To prevent rotting of the doors by seepage of moisture between the door edges and their cover plates, both the sealing strips and the interlocking members are desirably provided with ribs or flanges 36 which project outwardly from and extend longitudinally of the inner surfaces of these members adjacent their outer edges and overlie and abut the adjacent portions of the outer or rear faces of the doors. The flanges may also be utilized to secure cover or finishing sheets 37 of metal, plastic or other material to the outer faces of the doors, the flanges for this purpose being spaced from the doors. Such sheets not only enhance the outward appearance of the doors but protect them from the ravages of the weather.

The edges of the facia plate, side walls and tail gate, which define the doorway, may be reinforced by edge or abutment members or reinforcing bars 38 which are attached to the edges in any suitable manner. The reinforcing bars are preferably Z-shaped, each having a web connecting a pair of spaced oppositely disposed flanges, of which one projects into the doorway and the other abuts and partially overlies the rear face of the member to which the bar is secured. When the doors are closed, the webs of the reinforcing bars form the engaging faces of the facia plate, side walls and tail gate against which the sealing strips on the doors abut, and the inwardly projecting flanges form abutments for the inner faces of the doors, thereby acting as both a stop to limit the inward movement of the doors and a seal against the entrance of foreign matter into the interior of the vehicle body. The advantage attendant the use of the flanges which overlie the outer faces of the doorway defining members is the prevention of seepage of moisture between the reinforcing bars and the members. For the reception of the dogs 21, the central portions of the reinforcing bars on the facia plate and tail gate are cut away with the exception of the flanges which project inwardly of the doorway, the latter being utilized both as reinforcements and as the members to which the brackets 25 are secured. The reinforcing bars on the side walls preferably extend the full height of the side walls so that they may form a backstop for the tail gate as well as the doors. The side walls may further be reinforced by the provision of angle irons 39 of which one leg abuts the outer face and the other the rear face of each side wall, the latter leg overlapping the rear face engaging flange of the Z-bar.

Since the effectiveness of the door locking mechanism is dependent, in part, upon the engagement between the hook 26 carried by the tail gate and its cooperating dog which tends to force the tail gate outwardly, it is desirable to provide means for latching the tail gate in closed position, which will not open accidentally. For this purpose there is provided a chain lock including a latch or catch 40 pivotally mounted on the outer side face of one of the side walls and having a depending lip 41 which is adapted to engage a projecting end of a bar 42 carried by the tail gate adjacent its upper limit. The bar may be attached to the tail gate by any suitable means, as by welding it to a finishing sheet 43 secured to the outer face of the tail gate. Intermediate the ends of the latch its shank 44 is offset outwardly from the side wall. Merging with and rising from this offset portion of the shank is a pair of spaced upstanding horns or prongs 45. As is customary, the outward movement of the tail gate is limited by a chain 46, one end of which is here attached to the bar 42 outwardly of its lip engaging portion and the other to the side wall.

In operation, the lip of the latch is first hooked over the bar and the chain is then intermeshed or interlocked with the horns by threading it through the slot defined by the horns. When the doors are subsequently closed in the manner previously explained, they are forced into tight engagement with each other and with the facia plate, side walls and tail gate, thereby forming, in effect, a solid end panel for the vehicle body which is capable of bracing the rear end of the body against undesired movement.

From the foregoing detailed description of the accompanying drawings it will be apparent that there has been provided a novel closure for an opening in a vehicle body which is capable not only of forming a weather seal for the interior of the body but also of bracing the body against movement under the impetus of the forces to which it is subjected in transit, which formerly limited the effective life of the body to a relatively short period.

It should be understood that the drawings merely illustrate a preferred embodiment of the invention and all such modifications are intended to be included as depart neither from the spirit of the invention nor the scope of the appended claims.

Having now described my invention, I claim:

1. In a truck body, the combination of closure members for the open end thereof, said members comprising a tail gate hingedly attached to said body and a pair of doors each of which is hingedly mounted on one side of said opening, the inner edges of said doors having complementally curved interlocking faces, said faces being fixed against relative movement with reference to said doors, a rotatable member mounted in one of said doors adjacent the inner edge thereof, and means carried by said body and tail gate and cooperating with said rotatable member for locking said doors and gate in closed position.

2. A closure for the open end of a vehicle body comprising a pair of doors hingedly attached adjacent their outer edges to said body on opposite sides of said opening, the inner edges of said doors being complementally curved and adapted to interlock when said doors are in closed position, the curved edge of each door being rigid therewith, a gate hingedly attached to said body, a rotatable member carried by one of said doors adjacent its inner edge, and means carried by said gate and body and coacting with said rotatable member for locking said doors and gate in closed position.

3. In a closure for an opening in a vehicle body, the combination of a pair of doors hingedly mounted adjacent their outer edges to said body on opposite sides of said opening, abutment means mounted on edges of said body defining said opening, reinforcing means mounted on the corresponding edges of said doors, interlocking members carried on the contiguous faces of said doors and having complementally curved engaging faces for locking said doors against relative movement when said doors are closed, and means associated with one of said doors for closing said doors and forcing said reinforcing means into tight engagement with said abutment means to form a rigid connection between the sides of said body.

4. In a closure for an opening in a vehicle body, the combination of a pair of doors hingedly attached adjacent their outer edges to said body on opposite sides of said opening, reinforcing bars carried on edges of said body defining said opening, sealing strips carried on the corresponding edges of said doors, interlocking members carried on the inner edges of said doors, the outer face of one of said members being concave and adapted to conform to the complementally formed outer face of the other of said members, said latter member having a longitudinally extending substantially cylindrical recess, a shaft rotatably mounted in said recessed member, a dog secured to said shaft adjacent one end thereof, and a lever secured to said shaft intermediate its ends, said dog being adapted to engage means secured to said body on the operation of said lever and force said interlocking members into engagement and said sealing strips into close contact with said reinforcing bars, said doors, when closed, thereby forming a rigid connection between the sides of said body.

5. A closure for an opening in a vehicle body comprising a pair of doors pivotally attached adjacent their outer edges to said body on opposite sides of said opening, interlocking members carried on the inner edges of said doors, one of said members having a concavely curved outer face, the corresponding face of the other of said members being complementally curved, a shaft rotatably mounted within one of said members, actuating means attached to said shaft intermediate its ends, and means on said shaft for coacting with means secured to said body and forcing said interlocking members into engagement on operation of said actuating means.

6. Mechanism for locking a tail gate on a vehicle body in closed position comprising a bar secured to and projecting outwardly of said tail gate, a latch pivotally attached to said body and adapted to clamp over said bar, a chain extending between and connecting said bar and body, said chain being of the length required to limit the outward movement of the tail gate to the desired extent, and a pair of spaced horns upstanding from said latch, said chain being adapted to be intermeshed with said horns to lock said latch in bar clamping position.

7. In a closure for an opening in a vehicle body, the combination of a pair of doors hingedly attached adjacent their outer edges to said body on opposite sides of said opening, a reinforcing member secured to an edge of said body and having a flange extending into said opening, said flange being adapted to act as a stop to limit the inward movement of said doors, interlocking members attached to the confronting edges of said doors through tongues seated in grooves in said doors, the engaging faces of said interlocking members being complementally curved for locking said doors when closed against relative movement, and means rotatably mounted in one of said members for closing said doors.

8. In a closure for an opening in a vehicle body, the combination of a pair of doors hingedly attached to said body adjacent their outer ends on opposite sides of said opening, interlocking members mounted on edges of said doors and having tongues extending into grooves in said doors and flanges overlying the outer faces of said doors, sheets mounted on the outer faces of said doors and secured thereto by the flanges of said interlocking members, the outer surfaces of the interlocking members mounted on the contiguous edges of said doors being complementally curved and adapted to interlock to prevent relative movement of said doors, and means rotatably mounted in one of said interlocking members and coacting with means secured to said body for forcing said doors into closed position.

9. In a closure for the open end of a vehicle body, the combination of a pair of doors hingedly attached adjacent their outer edges to said body on opposite sides of said opening and having channeled edges, cover plates attached to the edges of said doors, each of said plates having a longitudinally extending tongue seated in one of said channels and a flange projecting from said plate adjacent its outer edge and overlying the outer face of one of said doors, sheets mounted on the outer faces of said doors and secured thereto by the flanges on said plates, the plate on the inner edge of one of said doors having a concavely curved surface adapted to interlock with a convexly curved surface on the corresponding plate on the other of said doors, said latter plate having a cylindrical recess the axis of which is substantially parallel to the axis of said convex surface, a shaft rotatably received in said recess and having a dog adjacent one end and a lever arm intermediate its ends, and a hook secured to said body, said dog being adapted to engage said hook and force said curved surfaces into interlocking relation on operation of said lever.

10. Interlocking members for the confronting edges of a pair of doors, each comprising a base plate and a tongue projecting from and extending longitudinally of its inner face, the base plate of one of said members being in the form of an interrupted ring having a cylindrically convex outer face adapted to interlock with the complementally formed outer face of the base plate of the other of said members, said interrupted ring defining a cylindrical recess extending longitudinally of said plate.

11. Interlocking members for the confronting edges of a pair of doors, each comprising a base plate and a tongue projecting from and extending longitudinally of its inner face, the base plate of one of said members including a longitudinally extending cylindrical recess and having a convexly curved outer face adapted to interlock with the concavely curved outer face of the base plate of the other of said members.

12. Interlocking members for the confronting edges of a pair of doors, each comprising a base plate and a tongue projecting from and extending longitudinally of the inner face of said plate, the outer face of the base plate of one of said members being convex and adapted to interlock with the concave outer face of the base plate of the other of said members.

13. Interlocking members for the confronting edges of a pair of doors, each comprising a base plate having a pair of spaced ribs projecting from and extending longitudinally of its inner face, the base plate of one of said members being in the form of an interrupted ring having a cylindrically convex outer face adapted to interlock with the cylindrically concave outer face of the base plate of the other of said members, said interrupted ring defining a cylindrical recess extending longitudinally of said plate.

14. A chain lock for a tail gate on a vehicle body, comprising a bar secured to and projecting outwardly of said tail gate, a latch pivotally attached to said body and adapted to engage said bar, a chain connecting said bar and body, and a prong upstanding from said latch and adapted to intermesh with said chain to lock said latch in bar engaging position.

ROBERT A. FONTAINE.